United States Patent [19]

Spiess et al.

[11] Patent Number: 4,952,094
[45] Date of Patent: Aug. 28, 1990

[54] GROUND WATER DRAIN

[75] Inventors: Hansruedi Spiess, Delemont; Francois Galvanetto, Alle, both of Switzerland

[73] Assignee: Von Roll AG, Gerlafingen, Switzerland

[21] Appl. No.: 337,285

[22] Filed: Apr. 13, 1989

[30] Foreign Application Priority Data

Apr. 15, 1988 [CH] Switzerland ............ 1407/88

[51] Int. Cl.⁵ .................. E02D 29/14; E03F 5/06
[52] U.S. Cl. .................... 405/36; 210/164; 404/4
[58] Field of Search ............ 405/36, 52, 43, 45; 404/25, 26, 2, 4; 210/163, 164, 170; 49/465

[56] References Cited

U.S. PATENT DOCUMENTS

| | | | |
|---|---|---|---|
| 2,009,132 | 7/1935 | Gebris | 49/465 |
| 2,305,955 | 12/1942 | Dudley | 210/163 X |
| 2,701,027 | 2/1955 | Scoville | 210/163 |
| 3,703,194 | 11/1972 | Giordano | 210/163 X |
| 4,126,404 | 11/1978 | Ferns | 404/4 |
| 4,345,998 | 8/1982 | Graffis et al. | 404/4 X |
| 4,454,039 | 6/1984 | McCoy | 210/164 |
| 4,815,888 | 3/1989 | Stegmeier | 210/164 X |

FOREIGN PATENT DOCUMENTS

| | | |
|---|---|---|
| 0023380 | 2/1981 | European Pat. Off. . |
| 0085306 | 1/1983 | European Pat. Off. . |
| 404565 | 7/1966 | Switzerland ............ 404/25 |
| 11862 | of 1899 | United Kingdom ............ 404/25 |
| 2188664 | 10/1987 | United Kingdom . |

Primary Examiner—Dennis L. Taylor
Attorney, Agent, or Firm—Helfgott & Karas

[57] ABSTRACT

The ground water drain comprises a frame and a grating inserted in the frame. The grating has a central bar and a plurality of crossbars arranged normal to the central bar. Holding portions are provided in the frame over its support for the grating. Projecting portions formed on some crossbars project into the holding portions when grating is inserted into the frame. For the insertion of the grating, at least one projecting portion on one side of the grating is inserted into the corresponding holding portion and subsequently the opposite side of the grating is pressed down. The projecting portions have sloping faces which snap into the holding portions of the frame while the central bar is simultaneously elastic bent. Therefore the grating is positively secured in the frame and even when using an elastic material for the grating the latter cannot be moved to such an extent by the traffic travelling over it that it could jump out of the frame.

12 Claims, 10 Drawing Sheets

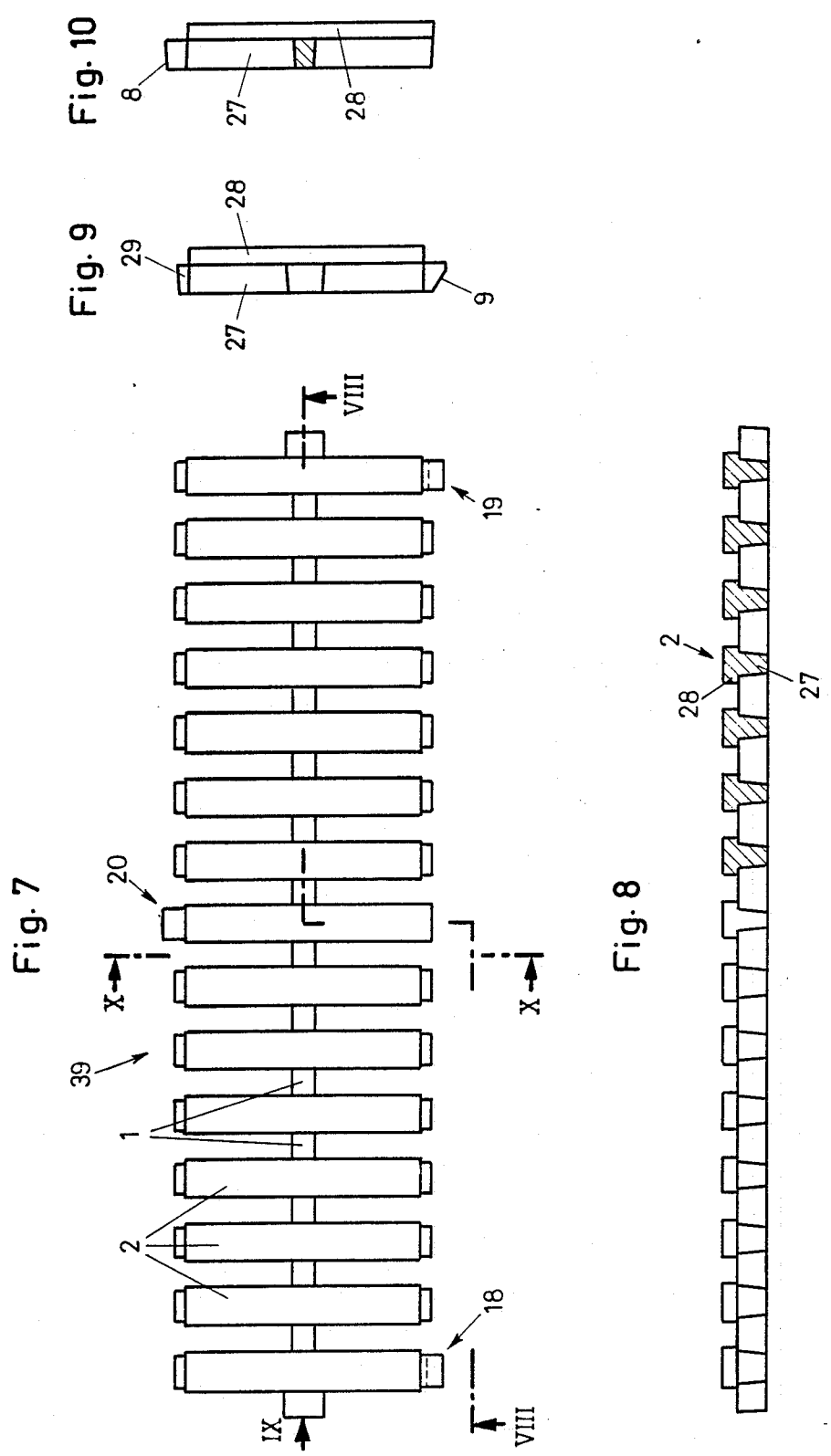

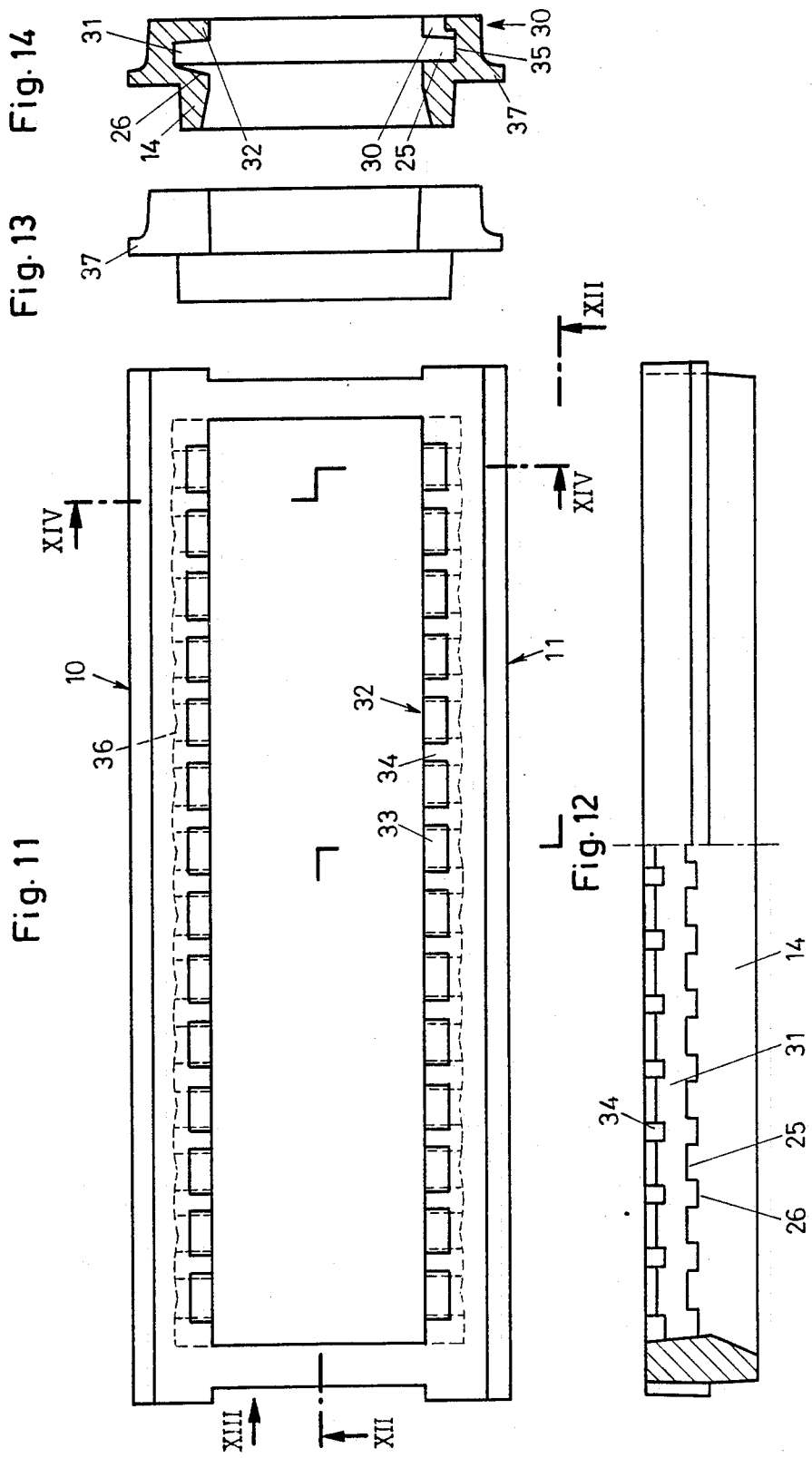

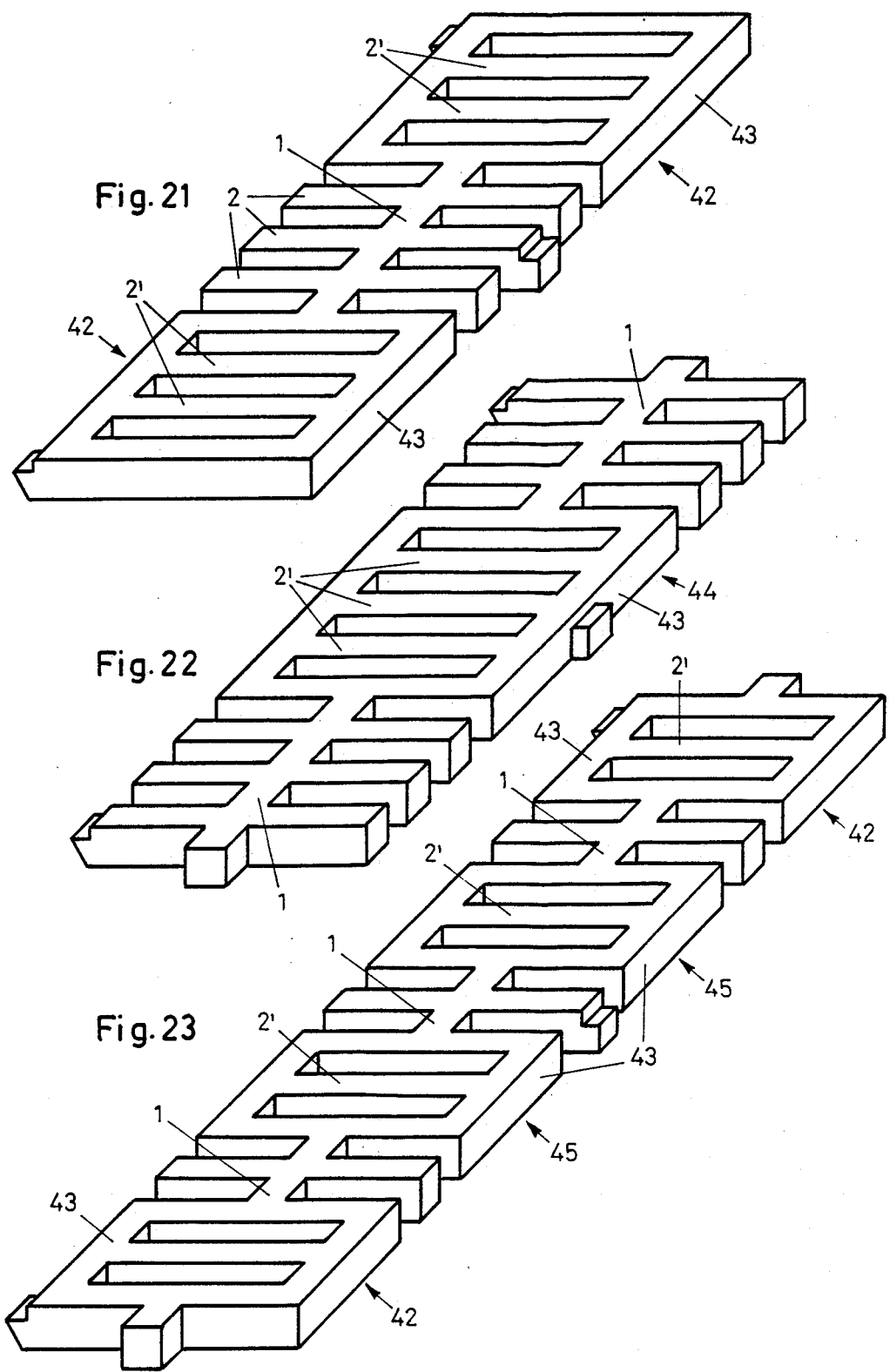

GROUND WATER DRAIN

BACKGROUND OF THE INVENTION

The present invention relates to a ground water drain for covering a ground opening and which comprises a frame laid in the ground and a grating supported on a frame support. The grating is made from a material with elastic properties and is insertable in the frame utilizing the elasticity. The grating is held in the frame with a positive fastening.

Ground water drains and, in particular, the gratings thereof have hitherto been manufactured in such a way that they constitute a relatively rigid structure, which is inserted in the frame. As a result of the relatively high dimensional stability of such gratings, the traffic travelling over the gratings has not been able to deform the gratings and, as a result, they could possibly jump out of the frame.

However, covers and gratings for ground water drains have been increasingly used, which have a lighter construction, because they are made from a material with a greater strength than typical cast iron and have a greater elasticity than the latter. Therefore the traffic travelling over the grating is able to elastically deform the latter, so that it is tensioned in much the same way as a spring and when the tension is removed it can deform to such an extent that it jumps out of the frame. Another disadvantage is that the presently used covers are provided with gratings, which can be relatively easily removed from the support located in the frame.

A ground water drain is known (DE No. 28 11 961), which is made from an elastic material and in which the grating bars are interconnected at their ends by spacers, in such a way that the complete grating constitutes an elastic structure. For the positive fastening of such a grating in the frame, it is known to provide holding parts on the front faces of the grating. The holding parts are hooked in corresponding frame parts, bringing about a positive connection between the grating and the frame. However, it is disadvantageous that the complete grating forms an elastic structure, which is elastically tensioned and relieved by the traffic travelling over it. Therefore, despite the positive fastening, as a result of its overall elasticity, the grating can jump out of the frame or can be relatively easily removed from the latter.

Gratings are known, in which special parts are constructed with increased elasticity and form a positive connection with corresponding parts in the frame. Admittedly with this grating there is no risk of jumping out, but the special construction of the elastic elements weakens the frame, and manufacturing costs are also increased.

SUMMARY OF THE INVENTION

It is an object of the present invention to provide a ground water drain, the grating of which is made from a higher elasticity material but is held in the frame by a positive fastening.

It is a further object of this invention to provide a grating constructed in a substantially rigid manner but however provided with such elasticity that it only acts in the direction of crossbars of the grating, i.e. at right angles to the direction of the traffic travelling over the grating.

This and other objects of the invention are attained by a ground water drain including a grating formed from bars and having at least one central bar extending over a ground opening, and on which are transversely arranged crossbars, whereof certain spaced apart bars are provided with a projecting portion and which crossbars, accompanied by an elastic deformation of the central bar, can be locked solely with the projecting portions in corresponding holding portions provided in the frame, with the formation of a positive fastening.

Thus, the crossbars, which essentially cover the entire grating surface, can have a rigid construction, whereas the central bar or bars are elastically deformable for the insertion into and removal of the grating from the frame.

The invention is described in greater detail hereinafter relative to non-limitative embodiments and the attached drawings.

BRIEF DESCRIPTION OF THE DRAWINGS

FIG. 7 is a plan view of a further modified embodiment of the grating;

FIG. 8 is a section taken along line VIII—VIII of FIG. 7;

FIG. 9 is a view of the grating from direction IX in FIG. 7;

FIG. 10 is a cross-section taken along line X—X;

FIG. 11 is a plan view of the frame for the grating according to FIG. 7;

FIG. 12 is a section taken along line XII—XII of FIG. 11;

FIG. 13 is a view from direction XIII in FIG. 11;

FIG. 14 is a section taken along line XIV—XIV of FIG. 11;

FIGS. 21-23 show perspective views of further modifications of the grating with a partly subdivided central bar;

DETAILED DESCRIPTION OF THE PREFERRED EMBODIMENTS

Figure 1:
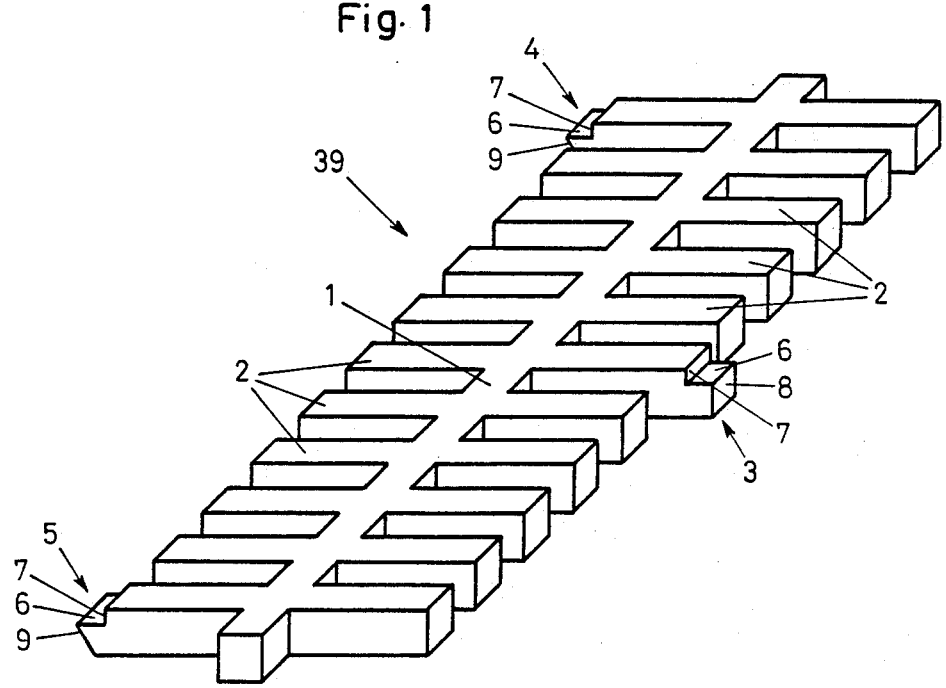
FIG. 1 is a perspective view of a grating for a rectangular frame with one central bar and crossbars connected thereto.

The grating shown in FIG. 1 and generally designated at 39 is intended for a rectangular frame and has a main bar 1, which in the embodiment of FIG. 1 is the central bar arranged in the center of the grating. On either side the central bar 1 has spaced crossbars 2, which are constructed as relatively rigid bars. Projecting portions 3, 4, 5 are shaped onto the free ends of three crossbars of the grating. The projecting portion 3 is arranged on one side of the central bar 1 and the projecting portions 4, 5 on its other side. Moreover, the projecting portion 3 is provided on a crossbar in the center of the grating and the projecting portions 4, 5 on the crossbars at the edges of the grating.

Projecting portion 3 has a lower-lying holding face 6, which is bounded by a vertical wall 7. Projecting portion 3 also has a vertical end face 8. The two projecting portions 4, 5 also have the holding face 6 and wall 7, but the end face is constructed as an inclined face 9. Conversely these portions 4, 5 can have a vertical end face 8, whilst the facing portion 3 has an inclined face 9 as the end face.

Figure 2:
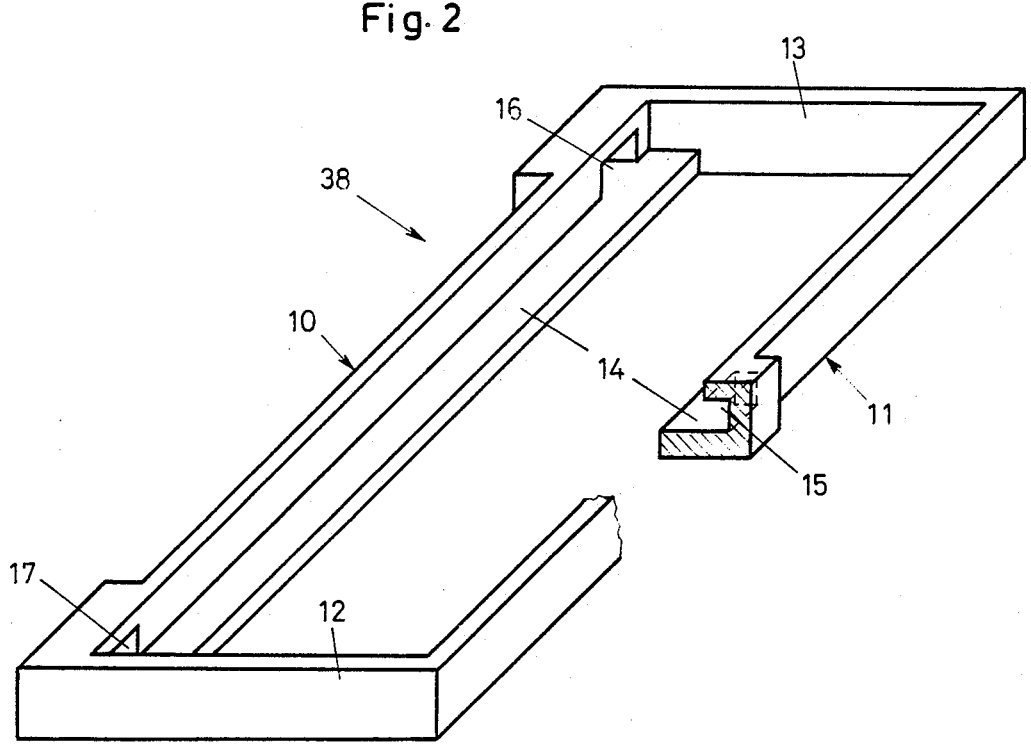
FIG. 2 is a perspective view of a frame for the positive fastening of the grating of FIG. 1.

The grating according to FIG. 1 can be inserted in a frame 38 shown in FIG. 2 and comprising two frame longitudinal parts 10, 11 and two frame transverse parts 12, 13. The frame longitudinal parts 10, 11 have a supporting flange 14 for mounting the grating according to FIG. 1. The frame longitudinal parts 10, 11 also have cavities constructed as holding parts 15, 16, 17. Cavity 15 is arranged in the center of frame longitudinal part 11 and cavities 16, 17 are provided on the ends of frame longitudinal part 10. For inserting the grating, initially the projecting portion 3 is inserted into cavity 15, the projecting portions 4, 5 on the opposite side resting on the frame longitudinal part 10. The grating is then pressed down at this side and slides on the inclined faces 9 of the projecting portions 4, 5. However, simultaneously central bar 1 is elastically bent at its protruding ends, so that the projecting portions 4, 5 can lock in cavities 16, 17, respectively which leads to the positive fastening of the grating in the frame.

The insertion of the frame can also take place in the reverse order, i.e. firstly with the portions 4, 5 having end faces 8 and then subsequently the portion 3 with the inclined face 9 is locked, accompanied by elastic deformation of central bar 1 in the center.

The complete grating according to FIG. 1 is relatively rigid. Only the central bar 1 can be elastically deformed to such an extent that the projecting portions 4, 5 or 3 can lock in the cavities 16, 17. The traffic travelling over this grating is not able to deform the grating to such an extent that it could jump in the manner of a tensioned spring out of the frame.

Figure 3:
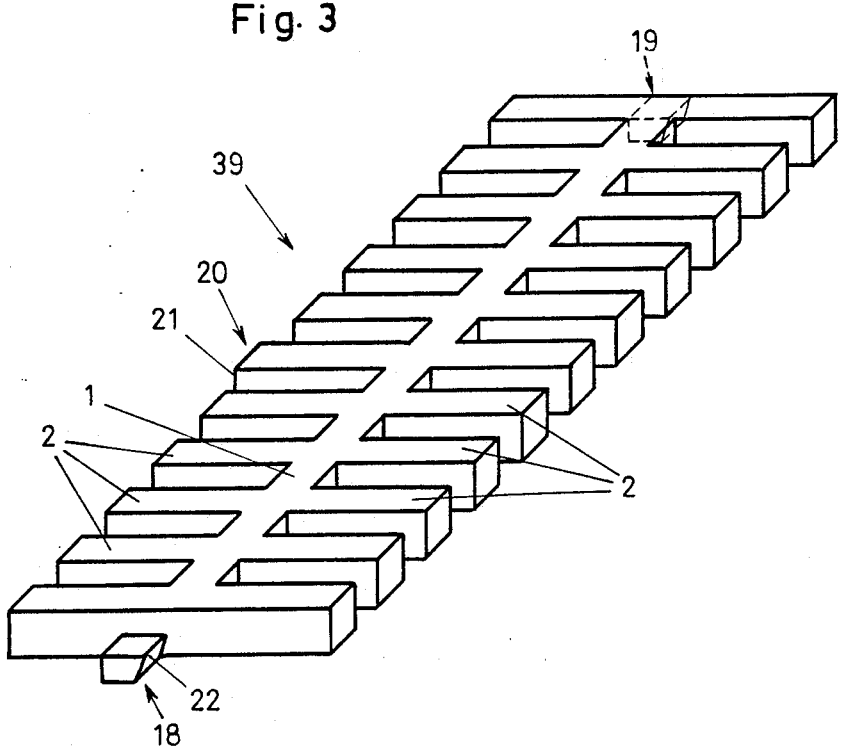
FIG. 3 is a perspective view of the modified embodiment of the grating.
Figure 4:
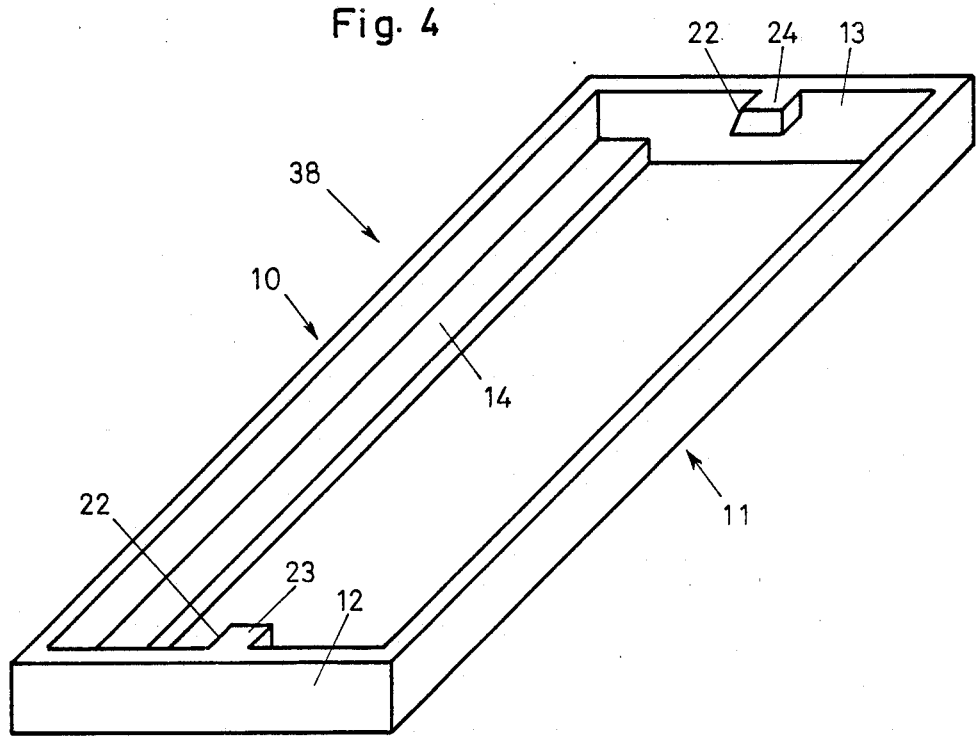
FIG. 4 is a perspective view of a frame adapted for the insertion of the grating according to FIG. 3.

FIGS. 3 and 4 show a variant of the ground water drain according to FIGS. 1 and 2. The central bar 1 of the grating is provided with projecting portions 18, 19 at its ends. A third projecting portion 20 is provided on a crossbar 2 located in the center of the grating, but this projecting portion 20 is nothing more than an extension of the particular crossbar 2 with a planar, vertical end face 21. The two projecting portions 18, 19 also have an inclined face 22 facilitating the insertion of the grating into the frame according to FIG. 4.

The frame suitable for inserting the grating according to FIG. 3 is shown in FIG. 4. On the inside of the frame it has transverse parts 12, 13 and holding parts 23, 24, which are constructed to cooperate with the projecting portions 18, 19 of the frame according to FIG. 3. The longitudinal parts 10, 11 of the frame according to FIG. 4 also have in each case a supporting flange 14, on which the grating rests.

For inserting the grating according to FIG. 3 in the frame of FIG. 4, the grating is inserted with that side where the projecting portion 20 is located. The frame is now pressed down, so that the projecting portions 18, 19 move past, accompanied by the bending of central bar 1 on holding portions 23, 24, which also have inclined faces 22. Once the frame has been completely pressed down, so that the crossbars 2 are mounted on the supporting flanges 14; the central bar 1 springs back, so that the projecting portions 18, 19 come to rest under the holding portions 23, 24. As simultaneously crossbar 2 is supported with the projecting portion 20 against the inner wall of the frame longitudinal part 10, the grating is fixed in the frame and secured with a positive fastening.

Figure 5:
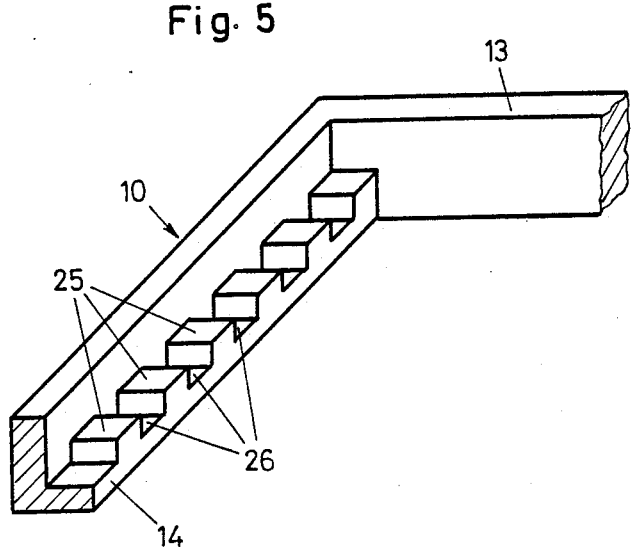
FIG. 5 is a partial perspective view of a frame with a toothed or serrated support for the grating.
Figure 6:
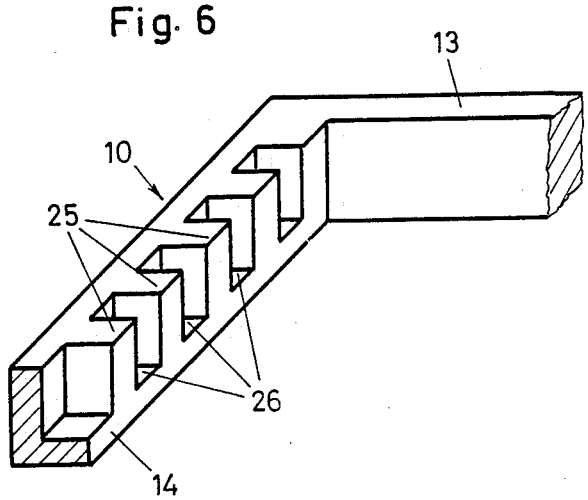
FIG. 6 is a partial perspective view of a frame with teeth extending up to the upper edge of the frame.

Each of the FIGS. 5 and 6 shows part of a frame, in which the longitudinal part 10 and the frame transverse part 13 are visible. Frame longitudinal part 10 is provided with a supporting flange 14, which is provided on the top with a tooth system as shown in FIG. 5. The tooth system comprises outwardly protruding parallelepipedic members or teeth 25 between which are located rectangular channels 26. The channels have a width corresponding to that of the crossbars, so that the crossbars 2 can be placed between the protruding members 25 in channels 26 and are consequently additionally secured. The grating 39 inserted in the frame 38 consequently receives an additional rigidity, which makes it insensitive to traffic travelling over it.

The difference between the tooth system according to FIG. 6 and that of FIG. 5 is that the teeth or protruding members 25 can extend up to the upper edge of the frame 38, i.e. the crossbars 2 located in channels 26 are surrounded completely on both sides by the members 25.

FIG. 7 to 10 show another grating comprising a central bar 1 and crossbars 2 arranged at right angles thereto. The two outer crossbars 2 and the central crossbar 2 have oppositely arranged, projecting portions 18, 19, 20. As can be gathered from FIGS. 9 and 10, the projecting portions 18, 19 have inclined faces 9, whilst projecting portion 20 has a vertical end face 8. The arrangement of the inclined faces 9 can also be reversed.

FIG. 8 shows a cross-section of crossbars 2. The crossbars are T-shaped in cross-section and have a web 27 and a leg 28. As is apparent from FIG. 7, the webs 27 of crossbars 2 project with a marginal portion 29 over the leg 28.

The frame to be assembled with the grating according to FIGS. 7 to 10 is shown in FIGS. 11 to 14. As can be gathered from FIG. 14, the frame longitudinal parts 10, 11 comprise a supporting flange 14 and an upper part 30. Between the upper part 30 and the supporting flange 14 is provided a groove 31, whose shape is apparent from the left-hand half of FIG. 12. FIG. 12 also shows that the supporting flange 14 has members 25 and channels 26. On the members 25 are supported the crossbars 2, whilst the channels 26 are inclined relative to the center of the frame, so that dirt and contaminants can be more easily removed.

A flange 32 of the upper part 30 of frame longitudinal part 10, 11 projects over the groove 31. Flange 32 has recessed 33, into which project the ends of crossbars 2 and are guided thereby legs 28. The recesses 33 are separated by a projection 34, on whose edges are guided the legs 28 of crossbars 2, shown in FIG. 8.

The rear wall 35 of groove 31 has inclined portions 36, which facilitate the removal of dirt when inserting the grating. FIGS. 13 and 14 show that the upper part 30 of the frame longitudinal parts 10, 11 has an outer flange 37, which is used for anchoring the frame in the ground.

The grating is inserted into the frame in the same way as was described for the previous embodiments. Firstly, the frame side with the projecting portion 20 is inserted and then the grating is pressed down, so that the inclined faces 9 of the projecting portions 18, 19 slide downwards, accompanied by the simultaneous deformation of the central bar 1, until the projecting portions 18, 19 lock in groove 31. If the inclined face 9 is located on portion 20, the insertion takes place in the reverse order. If all the projecting portions have inclined faces 9, the grating can be inserted in random manner. This also applies to the grating according to FIG. 1.

Figure 15:
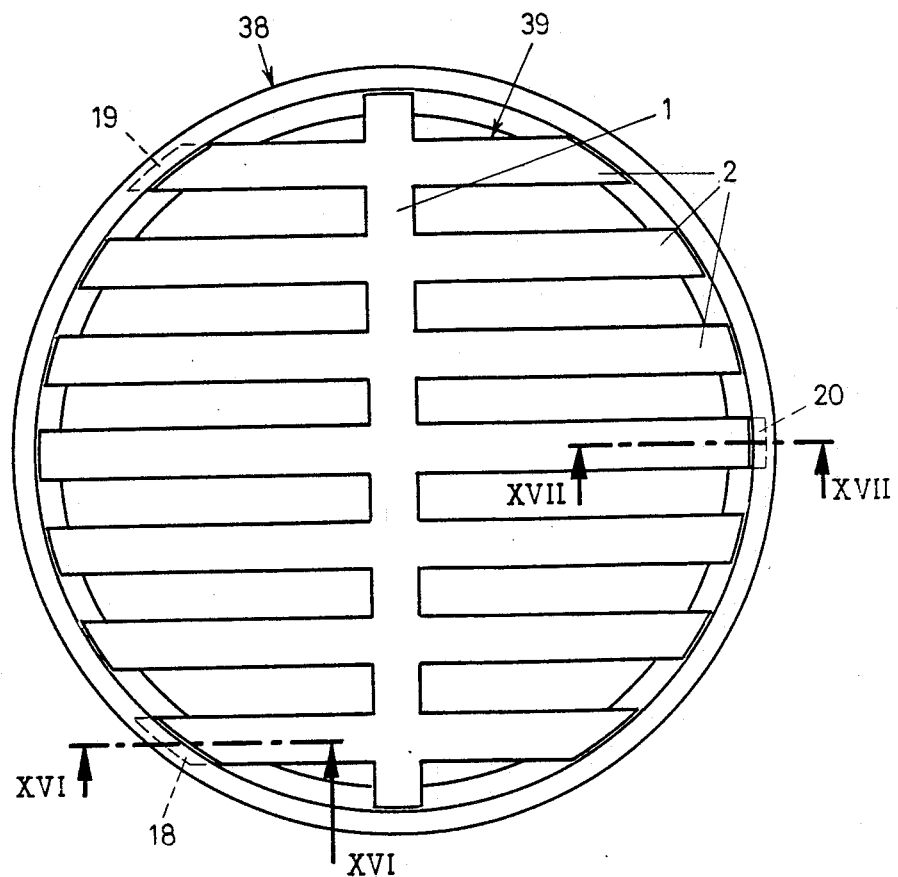
FIG. 15 is a plan view of a grating with a circular cross-sectional surface.
Figure 16:
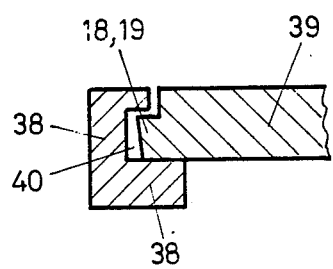
FIG. 16 is a section taken along line XVI—XVI in FIG. 15.
Figure 17:
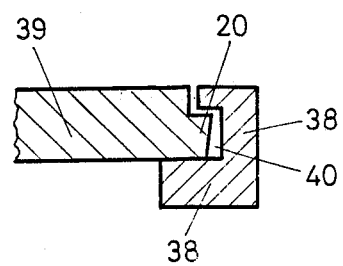
FIG. 17 is a section along line XVII—XVII in FIG. 15.

FIGS. 15 to 17 show a circular grating 39, which is inserted in a circular frame 38. As in the previously described gratings, grating 39 comprises a central bar 1 and crossbars 2 arranged thereon. The two outer crossbars 2 are provided with projecting portions 18, 19, whilst on the opposite side crossbar 2 is provided with the projecting portion 20. Projecting portions 18, 19, 20 project into recesses 40 of frame 38, cf. FIGS. 16 and 17. The projecting portions 18, 19, 20 are constructed in the same way as those of FIGS. 1 and 7.

Figure 18:
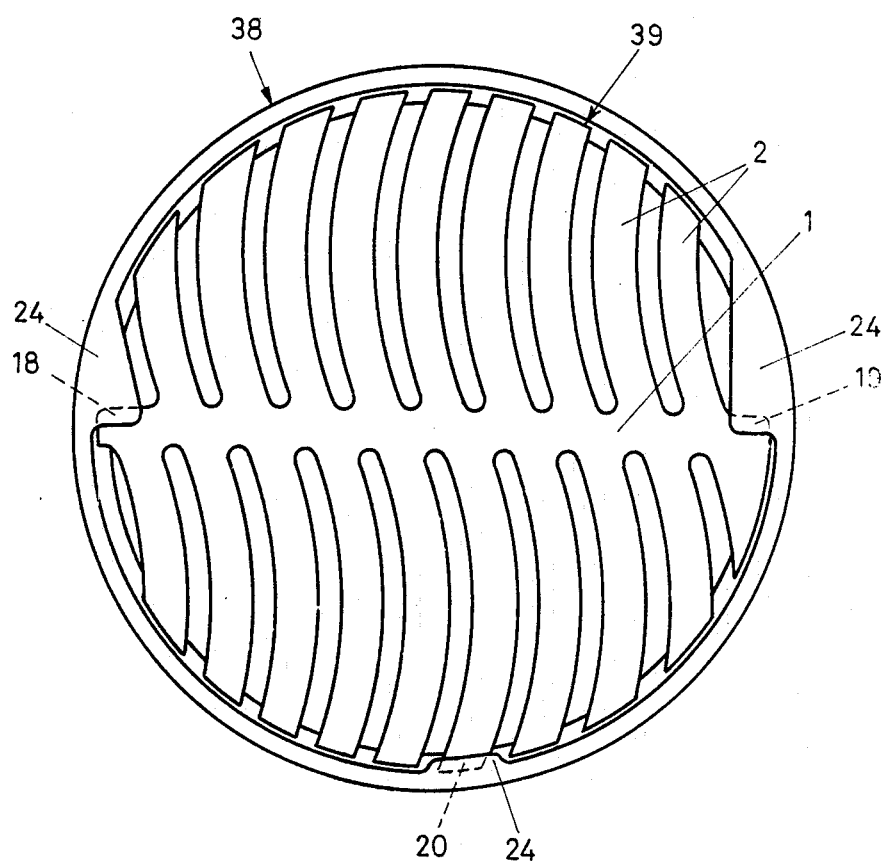
FIG. 18 is a plan view of still another embodiment of the grating in the form of a circular surface.

FIG. 18 shows a further circular ground water drain, in which bent crossbars 2 are arranged on the central bar 1. Grating 39 is fixed in frame 38 by projecting portions, which engage in holding portions 23, 24 of frame 38. Grating 39 is inserted in frame 38 in the same way as for the rectangular gratings, i.e. firstly the projecting portion 20 is inserted in holding portion 24 and then the grating 39 is pressed down until the projecting portions 18, 19 slide along the holding portions 23, accompanied by the bending of central bar 1, until they can lock therein.

Figure 19:
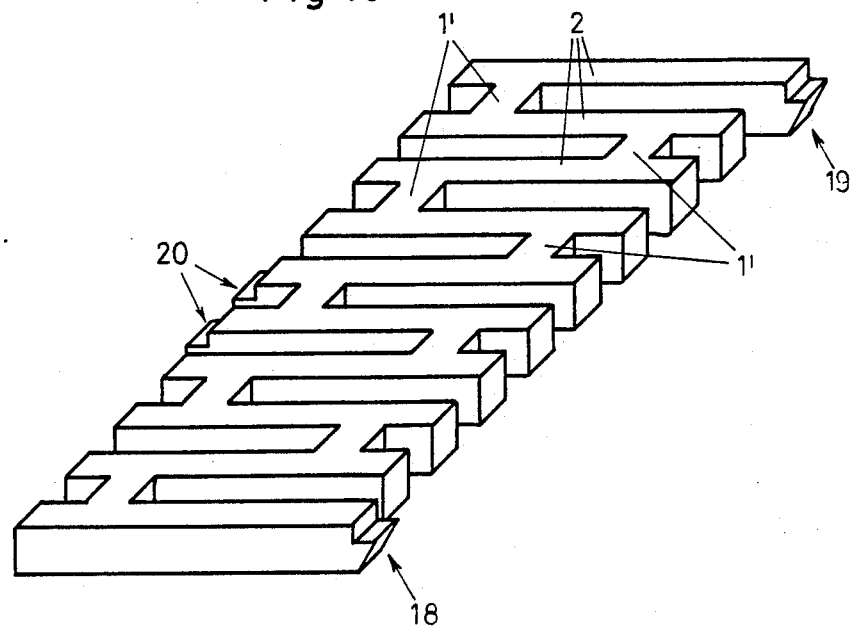
FIG. 19 is a perspective view of yet another embodiment of the grating with a subdivided central bar.
Figure 20:
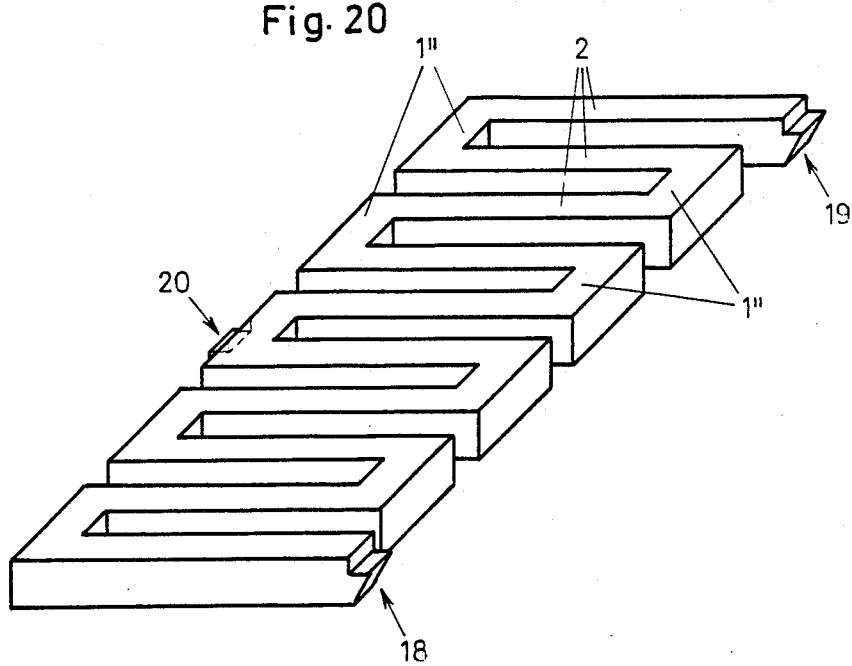
FIG. 20 is a perspective view of a further embodiment of the grating with a subdivided central bar.

FIGS. 19 and 20 show two further variants of grating 39, which in place of the central bar have partial or interrupted longitudinal bars 1', 1'', which are located along the central longitudinal axis of the grating, as is the case with the gratings according to FIGS. 1, 7, 15 and 18, but can instead be laterally displaced with respect thereto, without impairing the deformation during insertion at right angles to the longitudinal axis of the grating. In fact the possibility of deformation is increased, because on inserting the grating in the frame the crossbars 2 are also deformed during the deformation of the partial bars 1, 1'. In these embodiments of the gratings once again the projecting portions 18, 19, 20 are provided, so that they can be inserted in the same way as the gratings according to FIGS. 1, 7, 15 and 18.

If, unlike in the case of the embodiments according to FIGS. 19 and 20, a somewhat reduced deformation possibility is to be achieved, this is possible in that only parts of the central bar are retained, cf. FIGS. 21 to 23.

In FIG. 21 the central bar 1 only extends over roughly one third of the entire grating length and only in this area are the crossbars 2 constructed with free ends. However, the two end portions 42 of the grating are constructed as a relatively rigid frame, in which the crossbars 2' are interconnected by external frame bars 43.

In FIG. 22 the central bar 1 extends over the two end portions, whilst the central grating part 44 is constructed as relatively rigid frame with the frame bars 43 connecting the crossbars 2'.

The grating according to FIG. 23 has three portions provided with the central bar 1 and between which are arranged intermediate grating portions 45 with frame bars 43 connecting the grating bars 2'. On the grating ends are provided end portions 42 with frame bars 43 connecting the crossbars 2'.

In the embodiments of FIGS. 21 to 23, the end portions 42, central portion 44 and intermediate grating portion 45 constitute relatively rigid grating parts. The complete deformation possibility of the grating can be influenced by a corresponding arrangement of portions 42, 44 and 45. The described ground water drains have the advantage that the grating 39 can be given a relatively rigid construction and can only be deformed by bending the central bar 1 for inserting the grating in the frame. In place of a single central bar 1, it is also possible to provide two or more central bars in the case of larger ground water drains. The thickness of said central bars 1 merely has to be dimensioned in such a way that it is possible to bend the central bars on inserting the frame. A suitable tool can be used for inserting and removing the grating 39, so that the central bar or bars can be deformed. When the grating 39 is inserted in frame 38, it is positively held. It can also be pretensioned somewhat, so that the grating does not rattle when vehicles are travelling over it.

Figure 24:
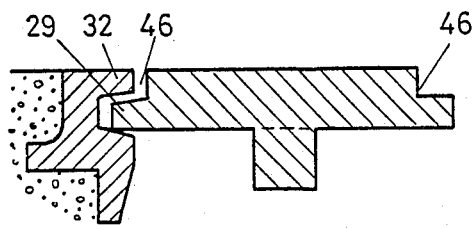
FIG. 24 is a cross-section of a ground water drain comprising a grating according to FIGS. 7 to 10 and a frame according to FIGS. 11 to 14, and absorption capacity-increasing means being provided on the grating.
Figure 25:
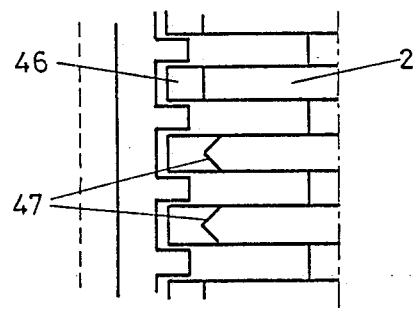
FIG. 25 is a plan view of the grating according to FIG. 21.
Figure 26:
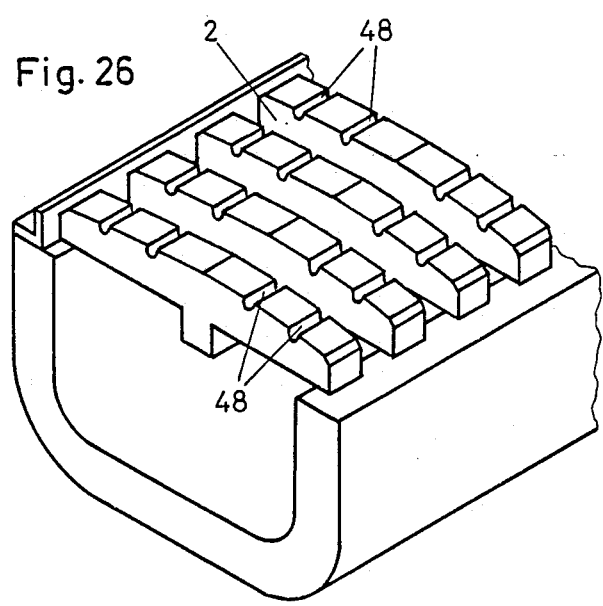
FIG. 26 is a partial perspective view of the ground water drain similar to that of FIG. 24, but with absorption capacity-increasing means arranged over the crossbars.

The absorption capacity of the described ground water drains can be improved with relatively simple means, as shown in FIGS. 24 to 26.

FIGS. 24 and 25 show a ground water drain with a grating according to FIGS. 7 and 10 and a frame according to FIGS. 11 to 14 in partial form. At the ends of crossbars 2, the marginal portion 28, also shown in FIG. 9, is enlarged by a recess 46, so that a gap is formed between the frame flange 32 and the crossbars by the recess 46 through which can flow out part of the liquid flowing towards the ground water drain. The absorption capacity can be further improved if, according to FIG. 25, the recess 46 is constructed with a wedge part 47. These absorption capacity-increasing parts according to FIGS. 24 and 25 can be provided in the foundry pattern, because they do not lead to extra work.

FIG. 26 shows another solution for increasing the absorption capacity of a grating according to FIG. 7. In this case the visible surface of the crossbars 2 is curved in a slightly convex manner, so that the level of said surface is higher in the central region of the grating than at the edges. The surface is provided with a plurality of transverse grooves 48, which form an outflow for the liquid flowing on the crossbars. The surface is slightly inclined in accordance with the convex shape of the crossbars between the transverse grooves 48, so that the liquid inflow against the center of the grating is stemmed.

It is possible to combine the measures described in FIGS. 24 and 25 for improving the absorption capacity of the grating with the measures according to FIG. 26.

Cast iron with nodular graphite or a plastic is e.g. suitable as the material for the described groundwater drains. Frame 38 and grating 39 are appropriately cast and preferably assembled without any further machining.

There has been disclosed heretofore the best embodiment of the invention presently contemplated. However, it is to be understood that various changes and modifications may be made thereto without departing from the spirit of the invention.

What is claimed is:

1. Ground water drain for covering a ground opening, comprising a frame to be laid in the ground, and a grating supported in said frame, the grating being made from a high elasticity material and being insertable in the frame utilizing the elasticity of said material, the grating being held in the frame with a positive fastening, said grating comprising at least one main bar extending in an axial direction of the grating, and a plurality of crossbars integral with said main bar and extending essentially in the same plane with and at right angles to said main bar, said grating including at least three projecting projections formed on said crossbars, said frame being provided with holding portions, said projecting portions of said crossbars cooperating with said holding portions so that, accompanied by the elastic deformation of said main bar, said projecting portions being situated at a side of said grating opposite to that carrying at least another of said projecting portions, at least one of said projecting portions being formed at a free end of the respective crossbar.

2. Ground water drain according to claim 1, wherein said main bar is a central bar extending along a central longitudinal axis of the grating.

3. Ground water drain according to claim 2, wherein two projecting portions are formed on two crossbars located at one side of said main bar and one projecting portion is provided on a crossbar located on an opposite side of said main bar.

4. Ground water drain according to claim 2, wherein two projecting portions are provided at two opposite faces of distal end crossbars, said holding portions being formed by projections provided on said frame, said two projecting portions cooperating with said projections for forming therebetween a self-closure, whilst a third projecting portion is located on a crossbar positioned roughly in the center between the two projecting portions of the central bar, said third projecting portion on said crossbar being supported on said frame.

5. Ground water drain according to claim 1, wherein said frame is provided with a tooth system including protruding members and channels alternating with said protruding members, said protruding members laterally engaging on said cross bars to fix said crossbars in position.

6. Ground water drain according to claim 5, wherein said protruding members extend up to an upper edge of the frame.

7. Ground water drain according to claim 5, wherein said crossbars are supported on said protruding members of said frame, said frame having a flange and a groove covered by said flange, said flange being formed with recesses for laterally engaging said crossbars in said frame.

8. Ground water drain according to claim 7, wherein said groove is provided on a rear wall thereof with inclined portions for facilitating the removal of dirt from said groove.

9. Ground water drain according to claim 7, wherein said channels of the tooth system each have an inwardly and downwardly inclined slope for facilitating the removal of dirt from said groove.

10. Ground water drain according to claim 2, wherein at least the holding portions provided on the same side of said frame have each an inclined face.

11. Ground water drain according to claim 1, wherein said frame is circular frame and said grating has a circular outer surface, wherein two of said projecting portions are arranged on two outer crossbars on one side of the main bar which is a central bar and a third projecting portion is arranged on a central crossbar on an end thereof facing away from the central bar, said holding portions being formed by recesses in said frame, said projecting portions engaging in said recesses of said frame.

12. Ground water drain according to claim 1, wherein at least part of some of the projecting portions has a sloping end face facilitating the insertion of the grating into the frame.

* * * * *